Sept. 23, 1958 E. B. HUDSON 2,853,288
SINTERING MACHINE
Filed May 23, 1955 2 Sheets-Sheet 1
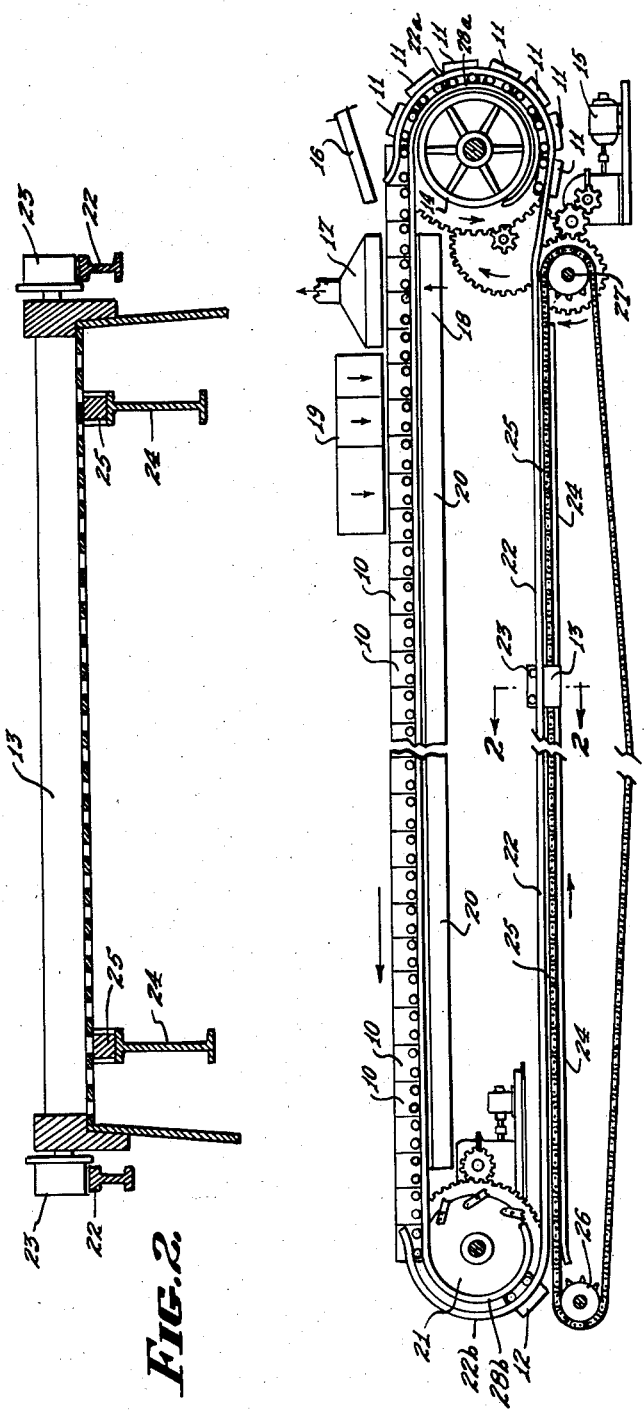
INVENTOR.
EDWIN B. HUDSON,
BY
ATTORNEYS.

Sept. 23, 1958     E. B. HUDSON     2,853,288
SINTERING MACHINE
Filed May 23, 1955     2 Sheets-Sheet 2
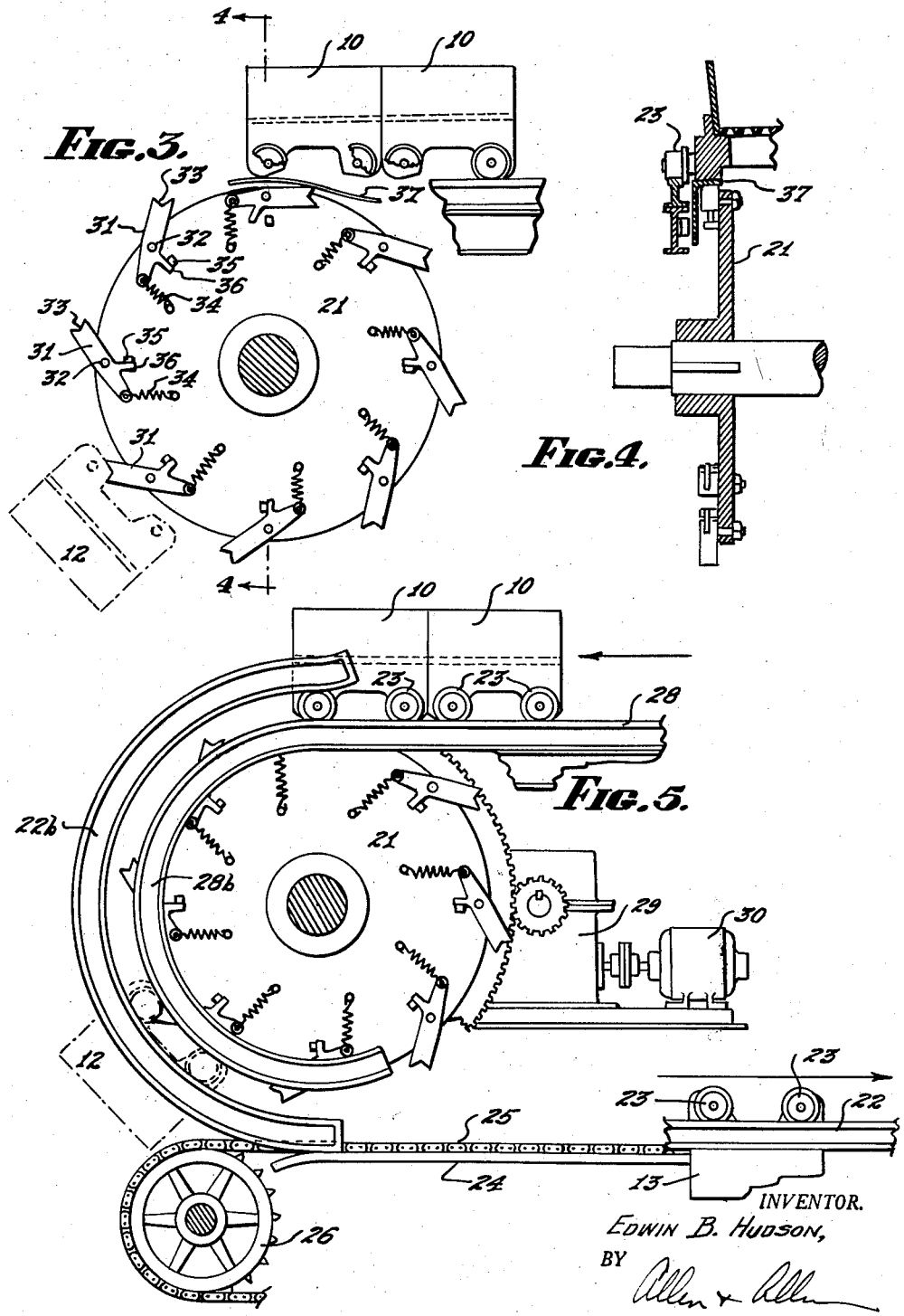
INVENTOR.
EDWIN B. HUDSON,
BY
ATTORNEYS.

United States Patent Office 2,853,288
Patented Sept. 23, 1958

2,853,288

SINTERING MACHINE

Edwin B. Hudson, Middletown, Ohio, assignor to Armco Steel Corporation, Middletown, Ohio, a corporation of Ohio Application May 23, 1955, Serial No. 510,384

8 Claims. (Cl. 266—21)

This invention relates to a sintering machine such as is used in the sintering of ore and flue dust to convert these materials into a more conveniently usable form. Conventionally, such machines have a so-called head sprocket and a so-called tail sprocket. Upper and lower rails are provided and the head sprocket is driven. Generally the head sprocket has means for engaging pallets which carry the ore or flue dust to be sintered and the drive from the sprocket to a particular pallet is transmitted to all the other pallets ahead of it on the sintering path. Thus, the pallets are slowly moved along a path during which they are subjected to the sintering treatment.

At the tail end of the machine, curve guide rails are associated with the tail sprocket and the pallets pass down around the tail sprocket and return to the head sprocket along a lower path empty and ready for recharging when they are picked up by the head sprocket.

An objection to machines of this type is that they use a large number of pallets which pallets, during approximately half of their travel, are not in use. They return to the charging point at a very slow speed and, therefore, they have cooled down considerably by the time they are recharged. The additional pallets are expensive and it is desirable to eliminate as many pallets as possible if this can be done without reducing the production capacity of the machine.

Various attempts have been made in the art to reduce the pallet requirements and such attempts have usually involved returning the pallets to the head sprocket down a steep grade. In this way, less pallets can be used because the return path is not at all times filled with pallets. This expedient has not proved satisfactory because the pallets are damaged when they collide with pallets previously delivered to the starting point at the end of their relatively fast trip down the downgrade.

Additionally, the movement of the pallets from the upper or sintering path to the lower or return path must not take place too fast because sufficient time must be allowed for complete dumping of the sintered charge. Attempts have been made in the art to provide sprockets at the discharge end mechanically coupled so as to be driven by the head sprocket. This has not proved practicable because the geared relationship between the sprockets is fixed by the physical dimensions of the parts making up the drive, while the dimensions of the pallets on the sintering path are constantly changing due to the temperature changes to which these pallets are subjected. The amount of such temperature change varies widely since the rate of burning of the sinter is not constant. It is necessary that the pallets on the sintering path be free to expand or contract with changes in temperature without producing a binding of the mechanism for lowering the pallets from the upper to the lower path.

With the foregoing considerations in mind, it is an object of the present invention to provide a sintering machine wherein means are provided to drive the pallets on their return path at a very much greater speed than they are driven on the sintering path. It is another object of the invention to provide means for positively lowering pallets from the upper path to the lower path at the discharge end of the machine at a speed greater than the speed of travel of the pallets in the sintering path and less than the speed of travel of pallets on the return path, such that while the pallets move very slowly in the sintering path, they are transferred from the sintering path to the return path at a higher speed and are then returned along the return path to the head end of the machine at a very much greater speed.

These and other objects of the invention which will be pointed out in greater detail hereinafter, or which will be apparent to one skilled in the art upon reading these specifications, are accomplished by that construction and arrangement of parts of which I shall now describe an exemplary embodiment.

Reference is made to the drawings forming a part hereof and in which:

Figure 1 is a fragmentary side elevational view of a sintering machine according to the present invention.

Figure 2 is a fragmentary cross-sectional view on a greatly enlarged scale taken on the line 2—2 of Figure 1.

Figure 3 is a detailed view of a tail wheel provided with dogs for lowering the pallets from the upper to the lower path.

Figure 4 is a fragmentary cross-sectional view taken on the line 4—4 of Figure 3, and Figure 5 is a view similar to Figure 3 but showing the guide rails, the drive for the tail wheel and the return conveyor.

Briefly, in the practice of the invention I provide a sintering machine having a head sprocket and a tail wheel and means for driving the head sprocket at a slow peripheral speed which may be on the order of six feet per minute. A guide rail is associated with the head sprocket so that pallets engaged by the head sprocket are raised up to the sintering path level and the drive is transmitted to other pallets ahead in line in abutting relationship throughout the length of the sintering path.

The tail wheel is driven by separate drive means through an irreversible drive at a peripheral speed which is higher than the speed of the pallets along the sintering path. By way of example, this peripheral speed may be thirty feet per minute. Pallet engaging means are provided on the tail wheel so that as a pallet reaches a position where it would tend to drop by gravity, it will be engaged by a pallet engaging means on the tail wheel and will be lowered at a faster speed but less than free falling speed to the level of the return path. For the return path there is provided a conveyor which is driven at a much higher speed, which may be on the order of fifty-six feet per minute, and this conveyor returns the empty pallets to a point where they may be picked up by the head sprocket. In a typical machine of the conventional type wherein pallets are disposed in abutting relation all the way around the sintering and return path and in which 181 pallets would thus be required, use of the present invention makes it possible to reduce the number of pallets to 100. Whereas in a conventional machine the pallet would be on the sintering path for 28 minutes and would take about two minutes at the discharge end to move from the upper to the lower level, 28 minutes to return to the charging end and about 2½ minutes to be raised back to the upper path so that it would have about 32½ minutes to cool down, with a machine according to the present invention, it takes only about 6½ minutes for the pallet to move from the upper level at the discharge end down to the lower level, back to the charge end and back up to the upper level. As a result of this, the used pallets are returned to the charging point at a much higher temperature than is now possible.

Referring now in greater detail to the drawings and particularly to Figure 1, the pallets are indicated at 10 as they move along the sintering path. A series of pallets are indicated at 11 which are being elevated by the head sprocket to charging position. A pallet is indicated at 12, which is being lowered to the return path and a pallet is indicated at 13 moving along the return path. The head sprocket is shown at 14 and it is driven through a gear train, as shown, by a motor 15. Material to be sintered is delivered to the pallets 10 by a feeder 16 and the pallets then pass over the hood 17 which carries off the hot air passing upwardly through the pallets from the wind box 18. The pallets then pass the furnace 19 wherein the charge is predried and ignited and the pallets then continue to pass over the wind boxes 20. It will be understood that the speed of travel of the pallets along the sintering path is related to the length of the machine. In a typical machine wherein the distance from the axis of the head sprocket 14 to the axis of the tail wheel 21 is 168 feet, the speed of travel may be six feet per minute.

The pallets are returned to the head end of the machine as indicated at 13. It will be understood that the pallets 13 are in up-side-down condition and hang from rails 22 by means of their wheels 23. Beams 24 carry the chains 25 which engage the pallets and pull them along the rails 22. The chains 25 run over sprockets 26 and 27 and the sprocket 27 may be driven through other gearing from the same motor 15, so as to move at a much faster linear speed, such as fifty-six feet per minute by way of example. It will be understood that the rails 22 at the head end of the machine are curved up around the sprockets 14 as indicated at 22a, so as to maintain the pallets 11 in contact with the sprocket. Similarly, at the tail end of the machine the rails 22 are curved up as at 22b around a tail wheel, so as to confine the pallets 12 to remain in contact with the dogs which will be described hereinafter.

Referring now in greater detail to Figures 3, 4 and 5, it will be seen that the pallets in their movement through the sintering path ride on the rails 28. These rails, as was the case with the rails 22, are bent down at the head end of the machine around the head sprocket, as indicated at 28a, and at the tail end of the machine they are bent around, as at 28b.

With the pallets 10 moving toward the left in Figure 5, it will be clear that after the center of gravity of the first pallet passes to the left of the axis of the dog wheel 21, it will tend to fall in a counterclockwise direction with its wheels passing between the rails 22b and 28b until it is hanging by its wheels from the rail 22. As pointed out hereinabove, such free fall would be undesirable because thorough dumping would not be assured and therefore means are provided whereby the dog wheel lowers the individual pallets to the lower path at a higher but controlled speed.

The dog wheel 21 is driven through gearing, which includes an irreversible worm gear drive 29, by the motor 30. The reason for the provision of an irreversible drive is that since the pallets are very heavy, there would be a tendency for the weight of the pallet to tend to rotate the wheel 21 at a faster speed than the motor 30 would drive it. With an irreversible element in the drive of this wheel, the speed of descent of the pallets is positively controlled.

The dog wheel or tail wheel 21 carries a plurality of dogs 31 equally spaced around the periphery of the wheel and which are pivotally mounted as at 32. Each dog has a pallet engaging end 33 and a spring 34 is provided for each dog to urge the dog to pivot in a counterclockwise direction, as seen in Figure 3, to throw the end 33 outwardly to pallet engaging position. The outward pivotal movement is limited by stops 35 engaging the arms 36 which form a portion of the dogs 31. Thus, normally each dog remains in the position seen in Figure 3 and occupied by all except the uppermost dog.

Since the wheel 21 is rotating at a faster peripheral speed than the speed of travel of the pallets 10, means must be provided whereby the dogs are rocked out of the way so as to clear the pallets which have not quite reached discharge position. For this purpose I provide the cam plate 37 below the path of the pallets 10 and above the wheel 21 so that as the wheel 21 rotates in a counterclockwise direction, a dog coming up to the top of the wheel will be depressed, as shown in Figure 3, so as not to interfere with the normal feed of the pallets.

When a pallet 10 reaches a position where its center of gravity comes to the left of a vertical line through the axis of the wheel 21, it will tend to move to the left by gravity. As it accelerates, it will very shortly catch up with one of the dogs 31 and will engage it with its end 33, as indicated in broken lines at 12 in Figures 3 and 5. It will be engaged by a dog very shortly after it passes the axis of the wheel 21 and it will then be lowered at the peripheral speed of the wheel 21 to the return path. The peripheral speed of the wheel 21 may, for example, be on the order of thirty feet per minute or substantially an arithmetic mean between the speed of the pallets on the sintering path and the speed of the pallets on the return path.

From the foregoing description, it will be clear that I have greatly reduced the number of pallets required and have by the same token speeded up the return of pallets from their discharge point to their charging point, so that the pallets arrive at the charging point at a much higher temperature than has heretofore been possible. It will also be clear that the drive of the tail wheel is entirely independent of the drive of the head sprocket so that expansion or contraction of the pallets in the sintering path cannot produce a binding effect in any way whatsoever. The advantages of quick return are accomplished without subjecting the pallets to collisions so that the pallets have a longer life than has heretofore been possible.

It will be clear that modifications may be made without departing from the spirit of the invention and therefore I do not intend to limit myself otherwise than as set forth in the claims which follow.

Having now fully described the invention, what I claim as new and desire to secure by Letters Patent is:

1. In a sintering machine having means for moving pallets along a sintering path at an upper level at slow speed, and other means for returning empty pallets from the end of said sintering path to the beginning thereof along a path at a lower level and at a greatly increased speed; means for transferring pallets from the upper level at the end of said sintering path to the lower level at the beginning of said return path, comprising a wheel, and independent means for positively driving said wheel at a peripheral speed between the linear speed of said pallets along said sintering path and the linear speed of said pallets along the return path.

2. A machine according to claim 1, wherein said wheel is provided with a plurality of dogs equally spaced peripherally of said wheel for engaging individual ones of said pallets.

3. A machine according to claim 2, wherein the means for driving said wheel is irreversible, whereby the weight of the pallet engaged with said wheel cannot cause said wheel to rotate faster than said means will drive it.

4. A machine according to claim 3, wherein said means for driving said wheel includes an irreversible worm gear reduction.

5. A machine according to claim 1, wherein said wheel is driven at a speed approximately the arithmetical means between the linear speed of said pallets along said sintering path and the linear speed of said pallets along said return path.

6. A machine according to claim 1, wherein said wheel is provided with a plurality of dogs equally spaced peripherally of said wheel for engaging individual ones of said pallets and wherein each of said dogs is peripherally secured intermediate its ends to said wheel, each of said dogs having a pallet engaging end, spring means urging each of said dogs to pivot to a pallet engaging position with said pallet engaging end outwardly extended, and means limiting the spring urged pivotal movement of said dogs.

7. A machine according to claim 6, wherein a cam element is disposed above said wheel beneath the end of said sintering path to cause each dog as it passes said plate to be pivoted against the action of its spring so as to clear the pallets and the means for moving them along said sintering path.

8. A machine according to claim 1, wherein said slow speed is on the order of six feet per minute, said greatly increased speed is on the order of fifty-six feet per minute and the peripheral speed of said wheel is on the order of thirty feet per minute.

References Cited in the file of this patent

UNITED STATES PATENTS

| | | |
|---|---|---|
| 942,052 | Bellinger | Dec. 7, 1909 |
| 1,027,084 | Stehli | May 21, 1912 |
| 1,862,832 | Stehli | June 14, 1932 |

FOREIGN PATENTS

| | | |
|---|---|---|
| 589,984 | Germany | Dec. 7, 1933 |